United States Patent
Pirch et al.

(10) Patent No.: US 12,283,143 B2
(45) Date of Patent: Apr. 22, 2025

(54) UPPER LAYER DEVICE ARCHITECTURE FOR ULTRA-WIDE BAND ENABLED DEVICE

(71) Applicant: ASSA ABLOY AB, Stockholm (SE)

(72) Inventors: Hans-Juergen Pirch, Gratwein Strassengel (AT); Jan Steffl, Senomaty (CZ); Sylvain Jacques Prevost, Austin, TX (US); Fredrik Carl Stefan Einberg, Huddinge (SE)

(73) Assignee: ASSA ABLOY AB, Stockholm (SE)

( * ) Notice: Subject to any disclaimer, the term of this patent is extended or adjusted under 35 U.S.C. 154(b) by 0 days.

(21) Appl. No.: 18/649,346

(22) Filed: Apr. 29, 2024

(65) Prior Publication Data
US 2024/0282158 A1     Aug. 22, 2024

Related U.S. Application Data

(63) Continuation of application No. 17/755,620, filed as application No. PCT/EP2020/058824 on Mar. 27, 2020, now Pat. No. 12,002,312.
(Continued)

(51) Int. Cl.
*G07C 9/00*     (2020.01)
*G07C 9/22*     (2020.01)
(Continued)

(52) U.S. Cl.
CPC ........... *G07C 9/00309* (2013.01); *G07C 9/22* (2020.01); *H04B 1/69* (2013.01); *H04W 12/06* (2013.01);
(Continued)

(58) Field of Classification Search
CPC ................. G07C 9/0039; G07C 9/22; G07C 2009/00412; G07C 2009/003988;
(Continued)

(56) References Cited

U.S. PATENT DOCUMENTS 7,499,674 B2    3/2009   Salokannel et al.
7,597,250 B2   10/2009   Finn
(Continued)

FOREIGN PATENT DOCUMENTS

AU     2020381141     7/2024
CN      202703516     1/2013
(Continued)

OTHER PUBLICATIONS

"International Application Serial No. PCT EP2020 058824, International Search Report mailed Jul. 13, 2020", 4 pgs.
(Continued)

*Primary Examiner* — Dac V Ha
(74) *Attorney, Agent, or Firm* — Schwegman Lundberg & Woessner, P.A.

(57) ABSTRACT

A method of operating a seamless physical access control system comprises transferring communication session information using an out-of-band (OOB) communication channel of a smart ultra-wide band (UWB) capable device; establishing a secure OOB communication channel between the smart UWB capable device and a reader device using the communication session information; determining that a UWB enabled application of the smart UWB capable device needs secure ranging; establishing a secure UWB communication channel between the smart UWB capable device and the reader device; and transferring ranging information from a secure component of the smart UWB capable device to the reader device via the secure UWB communication channel.

20 Claims, 9 Drawing Sheets

Related U.S. Application Data

(60) Provisional application No. 62/932,175, filed on Nov. 7, 2019.

(51) Int. Cl.
  *H04B 1/69* (2011.01)
  *H04W 12/06* (2021.01)
  *H04W 76/10* (2018.01)

(52) U.S. Cl.
  CPC .. *H04W 76/10* (2018.02); *G07C 2009/00412* (2013.01)

(58) Field of Classification Search
  CPC ..... G07C 2209/10; H04B 1/69; H04W 12/06; H04W 76/10
  See application file for complete search history.

(56) References Cited

U.S. PATENT DOCUMENTS

| | | |
|---|---|---|
| 7,756,002 B2 | 7/2010 | Batra et al. |
| 7,881,746 B2 | 2/2011 | Desai |
| 7,995,644 B2 | 8/2011 | Sahinoglu et al. |
| 8,355,671 B2 | 1/2013 | Kramer et al. |
| 8,478,360 B2 | 7/2013 | Soliman |
| 8,736,438 B1 | 5/2014 | Vasquez et al. |
| 8,913,599 B2 | 12/2014 | Gonikberg et al. |
| 9,408,147 B2 | 8/2016 | Polo et al. |
| 9,530,265 B2 | 12/2016 | Lee et al. |
| 9,666,005 B2 | 5/2017 | Ellis et al. |
| 9,721,404 B2 | 8/2017 | Muller |
| 9,769,627 B2 | 9/2017 | Siswick et al. |
| 9,942,849 B1 | 4/2018 | Hariharan et al. |
| 10,117,046 B2 | 10/2018 | Ledvina et al. |
| 10,171,129 B1 | 1/2019 | Hammerschmidt et al. |
| 10,356,553 B2 | 7/2019 | Sant et al. |
| 10,486,646 B2 | 11/2019 | Ledvina et al. |
| 10,567,034 B2 | 2/2020 | Hammerschmidt et al. |
| 10,602,556 B2 | 3/2020 | Foster et al. |
| 10,652,925 B2 | 5/2020 | Naguib et al. |
| 10,660,037 B2 | 5/2020 | Hariharan et al. |
| 10,759,389 B2 | 9/2020 | Ledvina et al. |
| 10,819,029 B2 | 10/2020 | Amiri et al. |
| 11,728,841 B2 * | 8/2023 | Kabbinale ............... H04W 4/50 375/130 |
| 12,002,312 B2 | 6/2024 | Pirch et al. |
| 2003/0232620 A1 | 12/2003 | Runkle et al. |
| 2014/0179276 A1 | 6/2014 | Kang et al. |
| 2014/0355582 A1 | 12/2014 | Kamath et al. |
| 2015/0310681 A1 | 10/2015 | Avery et al. |
| 2015/0332532 A1 | 11/2015 | Lee et al. |
| 2016/0234008 A1 | 8/2016 | Hekstra et al. |
| 2016/0241999 A1 | 8/2016 | Chin et al. |
| 2016/0278006 A1 | 9/2016 | Lee et al. |
| 2016/0316500 A1 | 10/2016 | Aliyar |
| 2016/0353233 A1 | 12/2016 | Yong et al. |
| 2016/0360341 A1 | 12/2016 | Srivatsa et al. |
| 2017/0070919 A1 | 3/2017 | Verger et al. |
| 2017/0151918 A1 | 6/2017 | Boesen |
| 2017/0153636 A1 | 6/2017 | Boesen |
| 2017/0158202 A1 | 6/2017 | Yang |
| 2017/0232930 A1 | 8/2017 | Murar et al. |
| 2017/0236346 A1 | 8/2017 | Murar et al. |
| 2019/0097317 A1 | 3/2019 | Di Nallo et al. |
| 2019/0098499 A1 | 3/2019 | Lerch et al. |
| 2019/0116619 A1 | 4/2019 | Hauck et al. |
| 2019/0135229 A1 | 5/2019 | Ledvina et al. |
| 2020/0052905 A1 | 2/2020 | Mathias et al. |
| 2020/0053689 A1 | 2/2020 | Mcqueen et al. |
| 2020/0062217 A1 | 2/2020 | Ledvina et al. |
| 2020/0150261 A1 | 5/2020 | Naguib et al. |
| 2020/0259522 A1 | 8/2020 | Hammerschmidt et al. |
| 2020/0320188 A1 | 10/2020 | Graff et al. |
| 2020/0351781 A1 | 11/2020 | Hariharan et al. |
| 2022/0210631 A1* | 6/2022 | Lee ........................ H04B 1/69 |
| 2022/0375286 A1 | 11/2022 | Pirch et al. |
| 2023/0128414 A1* | 4/2023 | Seo ........................ H04L 5/0048 370/329 |
| 2023/0186704 A1* | 6/2023 | Pirch ....................... G06V 20/52 340/5.7 |
| 2023/0292132 A1 | 9/2023 | Perraud |

FOREIGN PATENT DOCUMENTS

| | | |
|---|---|---|
| CN | 109844822 | 6/2019 |
| CN | 110291754 | 9/2019 |
| CN | 114651289 | 6/2022 |
| EP | 2617242 | 10/2016 |
| EP | 3101874 | 12/2016 |
| IN | 202217026223 | 7/2022 |
| JP | 2017015562 | 1/2017 |
| JP | 6205237 | 9/2017 |
| JP | 2019168439 | 10/2019 |
| JP | 2019528387 | 10/2019 |
| JP | 2022554387 | 12/2022 |
| JP | 7457113 | 3/2024 |
| JP | 2024071428 | 5/2024 |
| KR | 101077406 | 10/2011 |
| KR | 20170040240 | 4/2017 |
| KR | 20190104401 | 9/2019 |
| KR | 102721088 | 10/2024 |
| WO | 2013178163 | 12/2013 |
| WO | 2016007627 | 1/2016 |
| WO | 2016059451 | 4/2016 |
| WO | 2017136725 | 8/2017 |
| WO | 2017144345 | 8/2017 |
| WO | 2018071671 | 4/2018 |
| WO | 2018160863 | 9/2018 |
| WO | 2019067105 | 4/2019 |
| WO | 2021089195 | 5/2021 |

OTHER PUBLICATIONS

"International Application Serial No. PCT EP2020 058824, Written Opinion mailed Jul. 13, 2020", 6 pgs.
"U.S. Appl. No. 17/755,620, Preliminary Amendment Filed May 3, 2022", 8 pgs.
"International Application Serial No. PCT EP2020 058824, International Preliminary Report on Patentability mailed May 19, 2022", 8 pgs.
"Mexican Application Serial No. MX a 2022 005511, Office Action mailed May 23, 2022", with manual English translation, 6 pages.
"Mexican Application Serial No. MX a 2022 005511, Response Filed Jul. 21, 2022 to Office Action mailed May 23, 2022", W English Claims, 13 pgs.
"Indian Application Serial No. 202217026223, First Examination Report mailed Aug. 31, 2022", 6 pgs.
"Japanese Application Serial No. 2022-526293, Voluntary Amendment Filed Aug. 24, 2022", W English Claims, 11 pgs.
"Indian Application Serial No. 202217026223, Response Filed Feb. 27, 2023 to First Examination Report mailed Aug. 31, 2022", W English Claims, 21 pgs.
"Australian Application Serial No. 2020381141, First Examination Report mailed Apr. 27, 2023", 3 pgs.
"Canadian Application Serial No. 3,157,336, Office Action mailed Jun. 8, 2023", 5 pgs.
"Canadian Application Serial No. 3,157,336, Response Filed Aug. 25, 2023 to Office Action mailed Jun. 8, 2023", 9 pgs.
"Japanese Application Serial No. 2022-526293, Notification of Reasons for Refusal mailed Sep. 12, 2023", with machine English translation, 14 pages.
"U.S. Appl. No. 17/755,620, Non Final Office Action mailed Oct. 4, 2023", 11 pgs.
"Australian Application Serial No. 2020381141, Response filed Oct. 3, 2023 to Office Action mailed Apr. 27, 2023", 56 pgs.
"Australian Application Serial No. 2020381141, Response Filed Oct. 3, 2023 to First Examination Report mailed Apr. 27, 2023", 16 pgs.

(56) References Cited

OTHER PUBLICATIONS

"Chinese Application Serial No. 202080077592.0, Office Action mailed Sep. 27, 2023", with English translation, 22 pages.

"Australian Application Serial No. 2020381141, Subsequent Examiners Report mailed Oct. 30, 2023", 3 pgs.

"Japanese Application Serial No. 2022-526293, Response filed Nov. 29, 2023 to Notification of Reasons for Refusal mailed Sep. 12, 2023", with English claims, 12 pages.

"U.S. Appl. No. 17/755,620, Response filed Dec. 8, 2023 to Non Final Office Action mailed Oct. 4, 2023", 10 pgs.

"Korean Application Serial No. 10-2022-7017400, Notice of Preliminary Rejection mailed Dec. 20, 2023", with English translation, 13 pages.

"U.S. Appl. No. 17/755,620, Notice of Allowance mailed Feb. 1, 2024", 7 pgs.

"U.S. Appl. No. 17/755,620, Notice of Allowability mailed Feb. 12, 2024", 4 pgs.

"Chinese Application Serial No. 202080077592.0, Response Filed Feb. 5, 2024 to Office Action mailed Sep. 27, 2023", with English claims, 13 pages.

"Korean Application Serial No. 10-2022-7017400, Response Filed Jan. 30, 2024 to Notice of Preliminary Rejection mailed Dec. 20, 2023", with English claims, 25 pages.

"Canadian Application Serial No. 3,157,336, Examiners Rule 86(2) Report mailed Apr. 3, 2024", 3 pgs.

"U.S. Appl. No. 17/755,620, Notice of Allowability mailed Apr. 15, 2024", 4 pgs.

"Australian Application Serial No. 2020381141, Response Filed Feb. 27, 2024 to Subsequent Examiners Report mailed Oct. 30, 2023", 77 pgs.

"Chinese Application Serial No. 202080077592.0, Decision of Rejection mailed Jun. 26, 2024", with English translation, 18 pages.

"Canadian Application Serial No. 3,157,336, Response filed Jul. 23, 2024 to Examiners Rule 86(2) Report mailed Apr. 3, 2024", 11 pgs.

"Chinese Application Serial No. 202080077592.0, Response Filed Sep. 11, 2024 to Decision of Rejection mailed Jun. 26, 2024", with English claims, 14 pages.

\* cited by examiner

UPPER LAYER DEVICE ARCHITECTURE FOR ULTRA-WIDE BAND ENABLED DEVICE

PRIORITY APPLICATIONS

This application is a continuation of U.S. patent application Ser. No. 17/755,620, filed May 3, 2022, which is a U.S. National Stage filing under 35 U.S.C. § 371 of PCT Patent Application No. PCT/EP2020/058824, filed on Mar. 27, 2020, which claims priority to U.S. Provisional Patent Application No. 62/932,175, filed on Nov. 7, 2019, all of which applications are incorporated herein by reference in their entireties.

TECHNICAL FIELD

Embodiments illustrated and described herein generally relate to upper layer device architectures for ultra-wide band enabled devices.

BACKGROUND

Ultra-wide band (UWB) is a radio frequency (RF) technique that uses short, low power, pulses over a wide frequency spectrum. The pulses are on the order of millions of individual pulses per second. The width of the frequency spectrum is generally greater than 500 megahertz or greater than twenty percent of an arithmetic center frequency.

DETAILED DESCRIPTION

Seamless access control refers to when physical access is granted to an authorized user through a controlled portal without requiring intrusive actions of the user such as entering or swiping an access card at a card reader or entering a personal identification number (PIN) or password. A Physical Access Control System (PACS) is a type of system that can provide seamless access. A PACS authenticates and authorizes a person to pass through a physical access point such as a secured door. The architecture of a PACS may vary significantly based on the application (e.g., a hotel, a residence, an office, etc.), the technology (e.g., access interfaces technology, door type, etc.), and the manufacturer.

Figure 1:
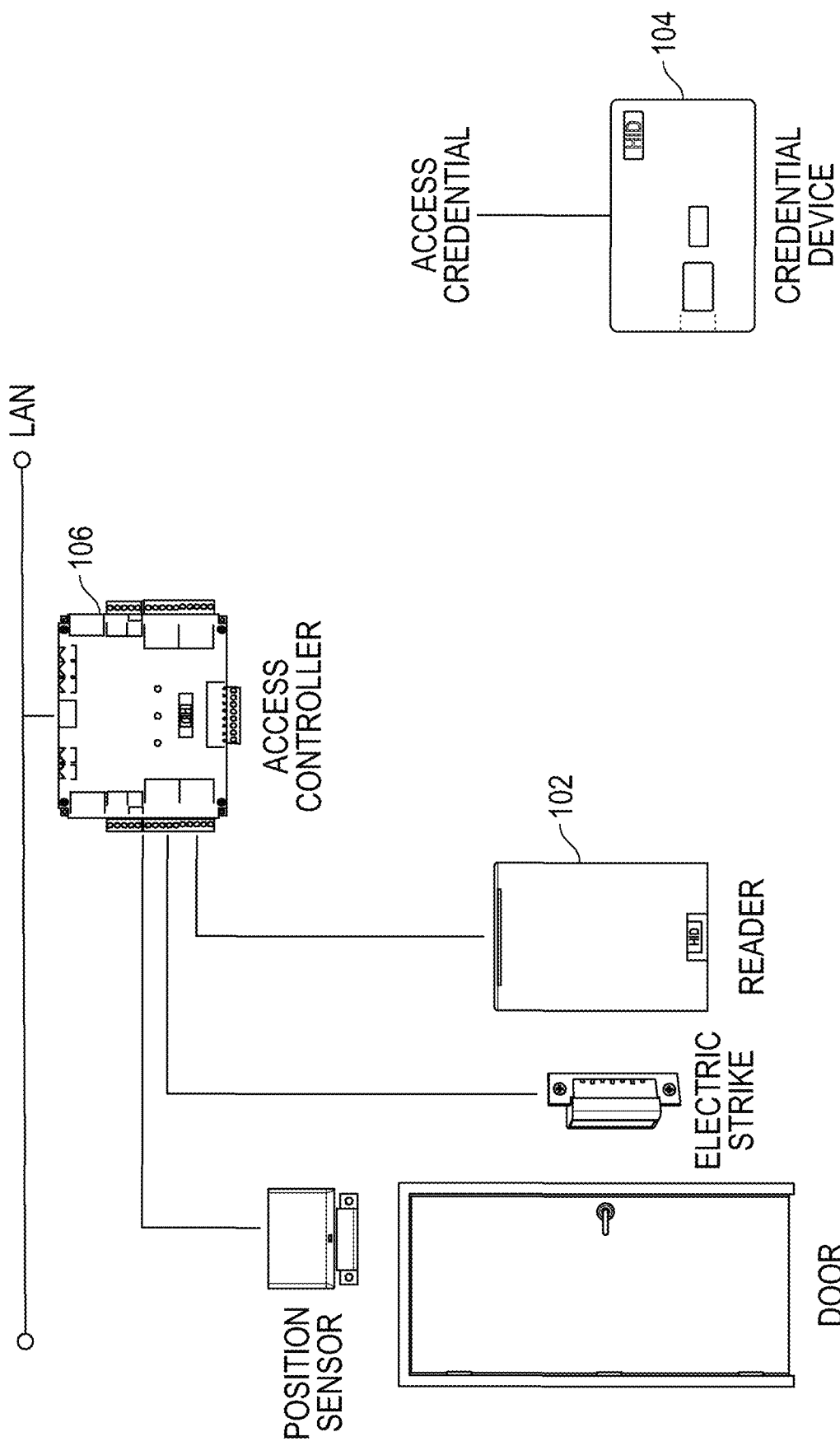
FIG. 1 is an illustration of a basic Physical Access Control System (PACS) structure.

FIG. 1 is an illustration of a basic PACS structure useful for an office application. The Access Credential is a data object, a piece of knowledge (e.g., PIN, password, etc.), or a facet of the person's physical being (e.g., face, fingerprint, etc.) that provides proof of the person's identity. The Credential Device 104 stores the Access Credential when the Access Credential is a data object. The Credential Device 104 may be a smartcard or smartphone. Other examples of Credential Devices include, but are not limited to, proximity RFID-based cards, access control cards, credit cards, debit cards, passports, identification cards, key fobs, near field communication (NFC) enabled devices, mobile phones, personal digital assistants (PDAs), tags, or any other device configurable to emulate a virtual credential.

The Credential Device 104 can be referred to as the Access Credential. The Reader device 102 retrieves and authenticates the Access Credential when using a Credential Device and sends the Access Credential to the Access Controller 106. The Access Controller 106 compares the Access Credential to an Access Control list and grants or denies access based on the comparison, such as by controlling an automatic lock on a door for example.

The functionality of an Access Controller 106 may be included in the Reader device 102. These Reader devices can be referred to as offline readers or standalone readers. If the unlocking mechanism is included as well, a device is referred to as smart door lock which is more typically used in residential applications. Devices such as smart door locks are often battery powered, and power consumption and battery lifetime can be key parameters for the devices.

For physical access applications, an electronic device needs to authenticate a person, which can require different methodologies than those used for electronic devices authenticating each other. Authentication methods for persons are typically split into three broad categories: "Something you know," "Something you have," or "Something you are." For a PACS, "Proof of Presence" is as important as the authentication when granting access through a particular physical portal at a given moment in time. Impulse Radio Ultra-Wideband (IR-UWB, or simply UWB) can provide Proof of Presence information in a secure manner.

Ultra-Wideband (UWB) is a radio communication methodology that uses a wide signal bandwidth. The wide bandwidth is typically defined as either a −10 decibel (dB) bandwidth greater than 20% of the center frequency of the signal, or a bandwidth greater than 500 megahertz (500 MHz) in absolute terms. Commercial UWB systems are intended to be used in complex environments such as residential, office, or industrial indoor areas. In these environments, signal reflection and diffraction play a significant role. The signal received by an antenna is the sum of the attenuated, delayed and possibly overlapping versions of the transmitted signal and may vary over time (due to movement of receiver/transmitter or change in environment). These different versions of the transmitted signal are typically referred to as multipath components. The large bandwidth of UWB systems provides a high level of resilience to frequency selective fading, which is an effect that can limit the performance of narrow-band technologies.

In a PACS, an access sequence consists of four parts: Proof of Presence, Intent Detection, Authentication, and Authorization. The user approaches the door and presents their access credential or credential device. This provides the Proof of Presence and Intent portions of the sequence. The reader device then checks the validity of the access credential (the Authentication portion) and sends it to the access controller, which grants or denies access (the Authorization portion). As explained above, seamless access is access granted without intrusive actions to show Intent (e.g., presenting a card, entering a password etc.), while maintaining the same level of security. The secure and accurate ranging capability of IR-UWB makes it a suitable technology to enable seamless access because the ranging can be used to determine Presence and Intent without actions by the user.

Figure 2:
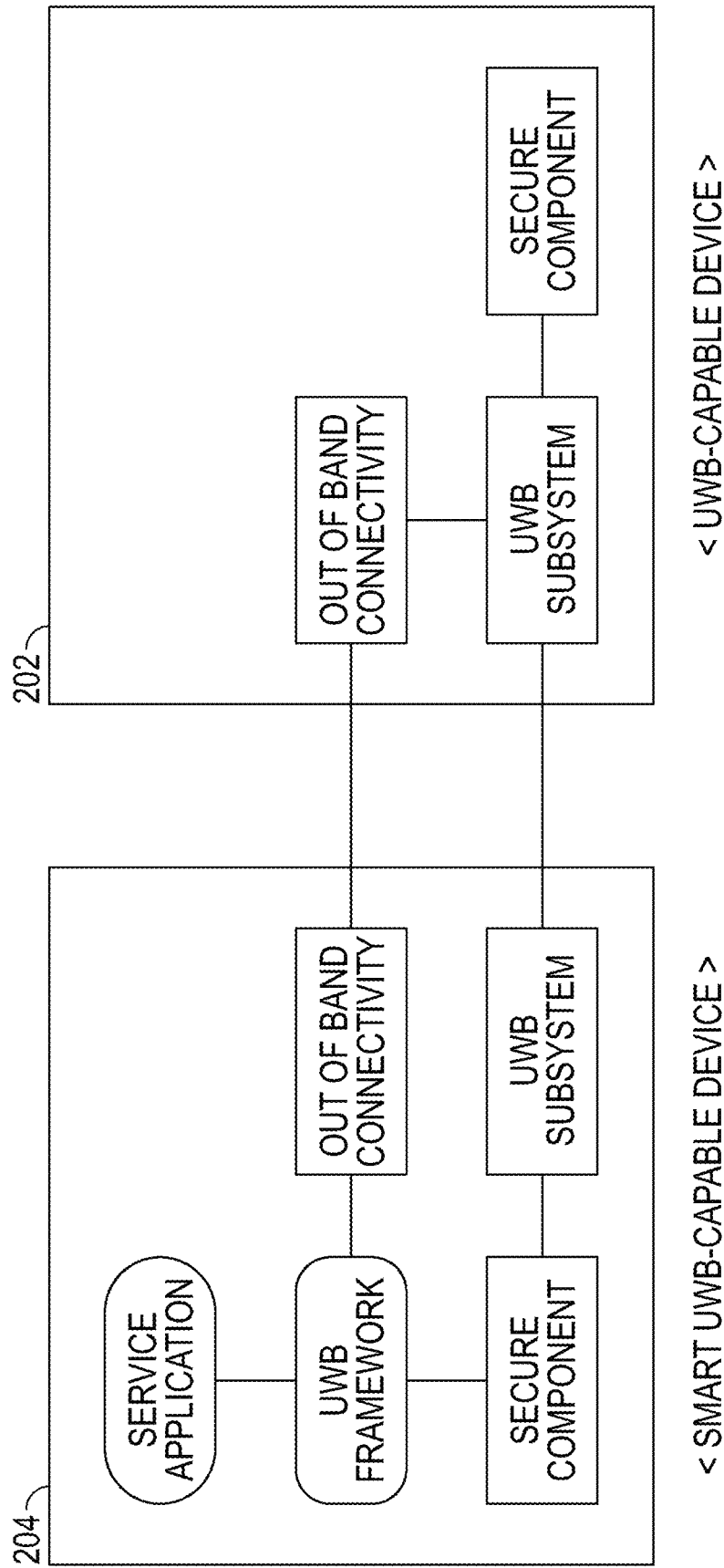
FIG. 2 is a block diagram of an example of an ultra-wide band (UWB) capable device and a Smart UWB capable device.

FIG. 2 is a block diagram of an example of a UWB capable device 202 (e.g., a Reader device or Reader & Controller device) and a Smart UWB capable device 204 (e.g., a Credential Device). Embodiments described herein include the following sequence for seamless access. First, out-of-band (OOB) (i.e., out of UWB) connectivity may be used for the Authentication part of the PACS access sequence. The OOB communication can be via Bluetooth® Low Energy (BLE) or other radio frequency (RF) technology. Second, the Proof of Presence and Intent Detection parts of the PACS access sequence are based on secure UWB ranging and communication between UWB subsystems of the devices. Third Authorization is granted or denied according to the Authentication, Proof of Presence, and Intent Detection.

BLE can be used for OOB communications for credential device discovery and application selection (in case the credential device hosts multiple UWB applications). A secure communication channel is established between the Credential Device 104 and the Reader Device 102. The secure communication channel is used by the Reader Device 102 to retrieve the access credential. After successful Authentication of the access credential, the Reader Device 102 negotiates the UWB RF parameters and shares a temporary session key (e.g., using a security token service or STS seed) with the Credential Device 104. At this point the OOB communication channel may be terminated and secure ranging with UWB is started. Apart from providing the session key exchange to secure the UWB communications, using BLE for the OOB communications offers lower energy consumption overhead during the device discovery phase, particularly in scenarios where devices are running multiple BLE applications in parallel. At the start of secure ranging, the two devices are not synchronized and an IR-UWB receiver may consume significant power when active (around 200 milliwatts in first generation IR-UWB integrated circuits). Using BLE for discovery and establishment of the secure channel allows the UWB receive time to be minimized When the Proof of Presence and the Intent criteria are met, the reader device releases the access credential to the access controller and the access grant or deny decision is made (Authorization). It should be noted, that in the case of standalone readers or smart door locks, Authorization may occur right after the transfer of the access credential, as the reader includes the access controller functionality. In this scenario, the UWB channel would only be established if a user has Authorization to pass through the door. This can significantly reduce energy consumption.

In conventional PACSs, the Intent to obtain access is actively indicated by the authorized user (e.g., by presenting a card or entering a password), but seamless access systems need to infer Intent to obtain access. A poorly defined or implemented Intent detection algorithm can lead to security issues. For example, a simple Intent detection algorithm that opens the door when an authorized user is within two meters, may open all doors in a corridor, when the user walks along the corridor without the intention to go through any of the doors.

Figure 3:
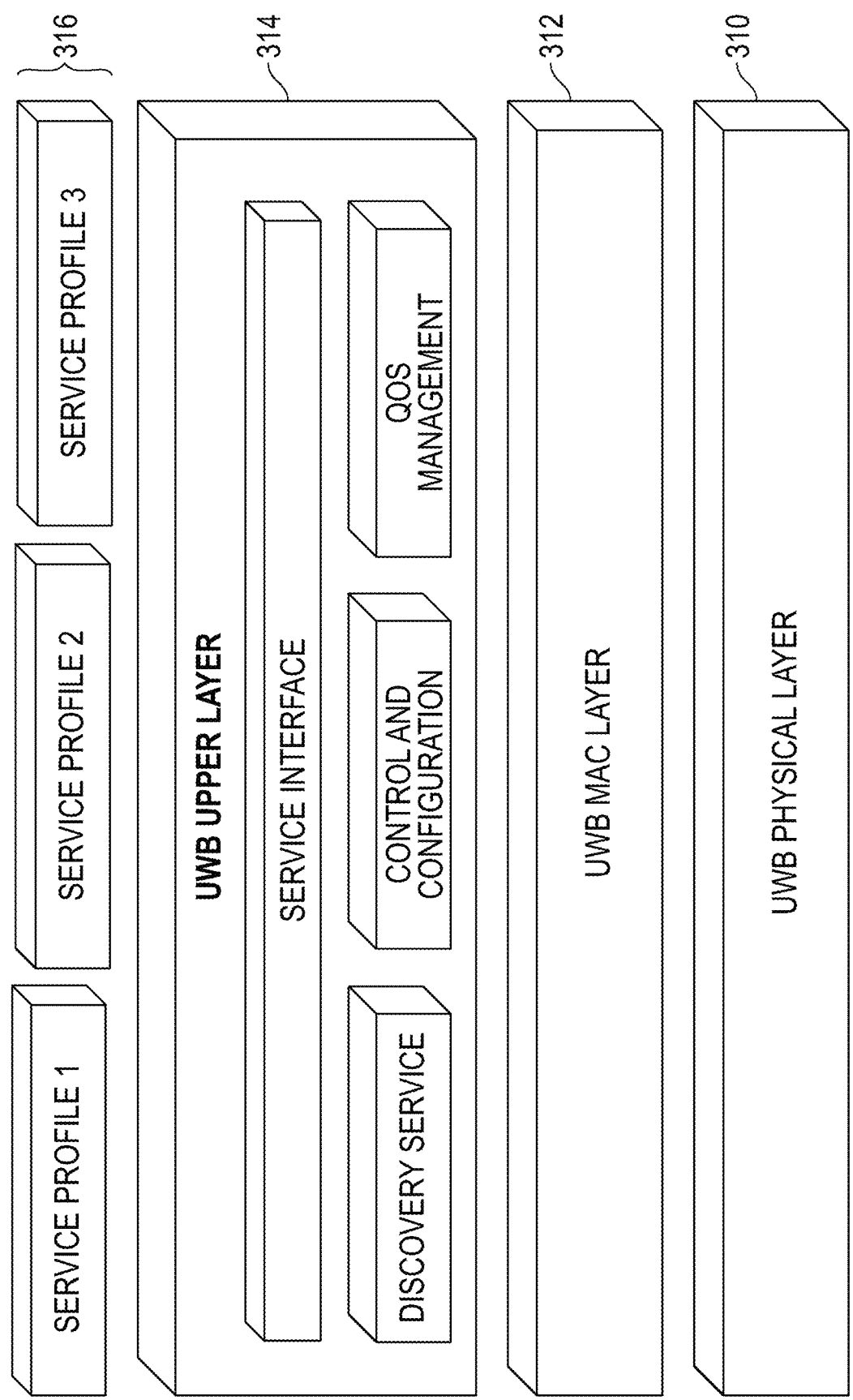
FIG. 3 is a block diagram of a layer model for a UWB enabled device.

FIG. 3 is a block diagram of a layer model for a UWB enabled device. The lowest layer is the UWB Physical Layer 310. The UWB Physical Layer 310 may be responsible for sending and receiving symbols for bits of individual packets used for ranging and positioning. Above the UWB Physical Layer 310 is the UWB Medium Access (MAC) Layer 314. The UWB MAC Layer may be responsible for providing packets to the UWB Physical Layer 310 and assembling received information into packets. Above the UWB MAC Layer is the UWB Upper Layer 314. The UWB Upper Layer 314 performs Discovery Service, Control and Configuration, and Quality of Service (QOS) management. Above the UWN Upper Layer is a Service Application Layer 316 implementing service profiles. The UWB Upper Layer 314 includes a Service Interface to the Service Application Layer 316.

Figure 4:
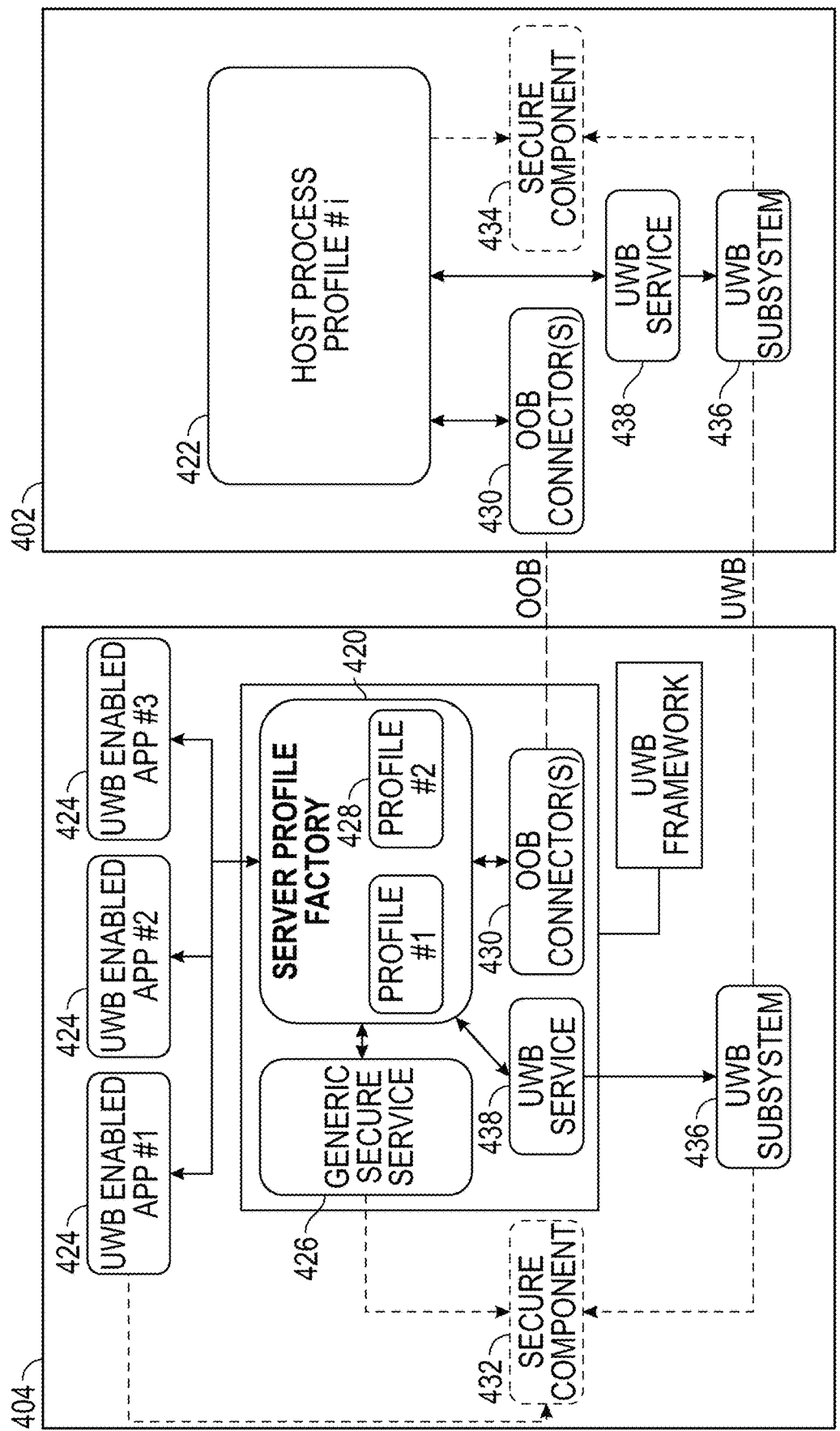
FIG. 4 is a block diagram of another example of UWB capable device and a Smart UWB capable device.

FIG. 4 is a block diagram of another example of UWB capable device 402 and a Smart UWB capable device 404. The devices communicate using an OOB interface (e.g., BLE) and a UWB interface. Other than the OOB Interface and the UWB Interface, the features may be implemented using the UWB upper layer of the devices. The Smart UWB capable device 404 includes a service-profile factory 420 to provide discovery service. The service-profile factory 420 aggregates and exposes service profiles 428 supported or implemented in the Smart UWB capable device 404.

The UWB capable device 402 includes a Host Process 422 implementing Profile #i. Profile #i configures the OOB connector 430 for each supported or implemented service-profile specification. FIG. 4 shows that the Smart UWB capable device 404 can support multiple UWB enabled Applications or Apps 424. The Profile #i handles App registration information. This information can be used for, among other things, source code control system (SCCS) discovery and OOB "card slot" enumeration. The Profile #i also dispatches OOB messaging to App registered listeners of the Smart UWB capable device 404. The Profile #i also exposes the profile application programming interface (profile API) to the UWB-enabled applications (e.g., a ranging API, positioning API, credentialing API, etc.) according to the service profiles of the UWB-enabled applications.

Both the UWB capable device 402 and the Smart UWB capable device 404 can include a secure component (434, 432). As an illustrative example, the secure component 432 of the Smart UWB capable device 404 may be the secure element of a smartphone and the UWB framework may be implemented by an application processor of the smartphone. The Smart UWB capable device 404 includes a Generic Secure Service 426. The Generic Secure Service 426 establishes a secure channel with the secure component 432 of the Smart UWB capable device 404. This secure channel between the Generic Secure Service 426 and the secure component 432 need not be the same, and in an example implementation, is not the same as the secure communication channel for the OOB activity and communication to establish Authentication of the access credential.

The Generic Secure Service 426 implements GOB discovery and connectivity according to an activated service-profile configuration. In an example implantation, GOB activity and OOB communication is via BLE and the OOB connector may be a Bluetooth® connector or Bluetooth® subsystem.

Both of the UWB capable device 402 and the Smart UWB capable device 404 include a UWB subsystem 436 and a UWB Service 438. The UWB subsystem 436 can perform a ranging session with the UWB subsystem of the other device. The UWB service 438 controls access to the UWB subsystem 436. In some examples, the UWB service 438 exclusively controls access to the UWB subsystem 436, such as by an interface between the UWB subsystem 436 and UWB Service 438, or via a protocol between a device host processor and the UWB subsystem 436. This interface can be referred to as a UWB control interface (UCI). The UWB Service 438 enumerates the capabilities of the UWB subsystem 436. In some examples, the UWB Service 438 controls and/or verifies the number of allocated UWB communication sessions, the UWB communication session priority or priorities, the generation of UWB communication session identifiers or IDs (this is useful to ensure uniqueness of sessions), and a secure versus an unsecure setup.

As explained above, the Smart UWB capable device 404 can support multiple UWB enabled Apps 424. A UWB enabled App activates and registers itself with a Service Profile 428. A UWB enabled App observes, consumes, and responds to OOB messaging notifications exposed via a service-profile API. A UWB enabled App may be responsible for establishing an OOB secure channel either directly with the OOB connector 430, or by forwarding to the secure component 432.

The UWB framework allows for the UWB enabled Apps 424 executing in the Smart UWB capable device 404 to leverage different security profiles for a seamless access sequence. The different security profiles provide different options for security of the credentialing and ranging/positioning of the Smart UWB capable device 404.

Figure 5:
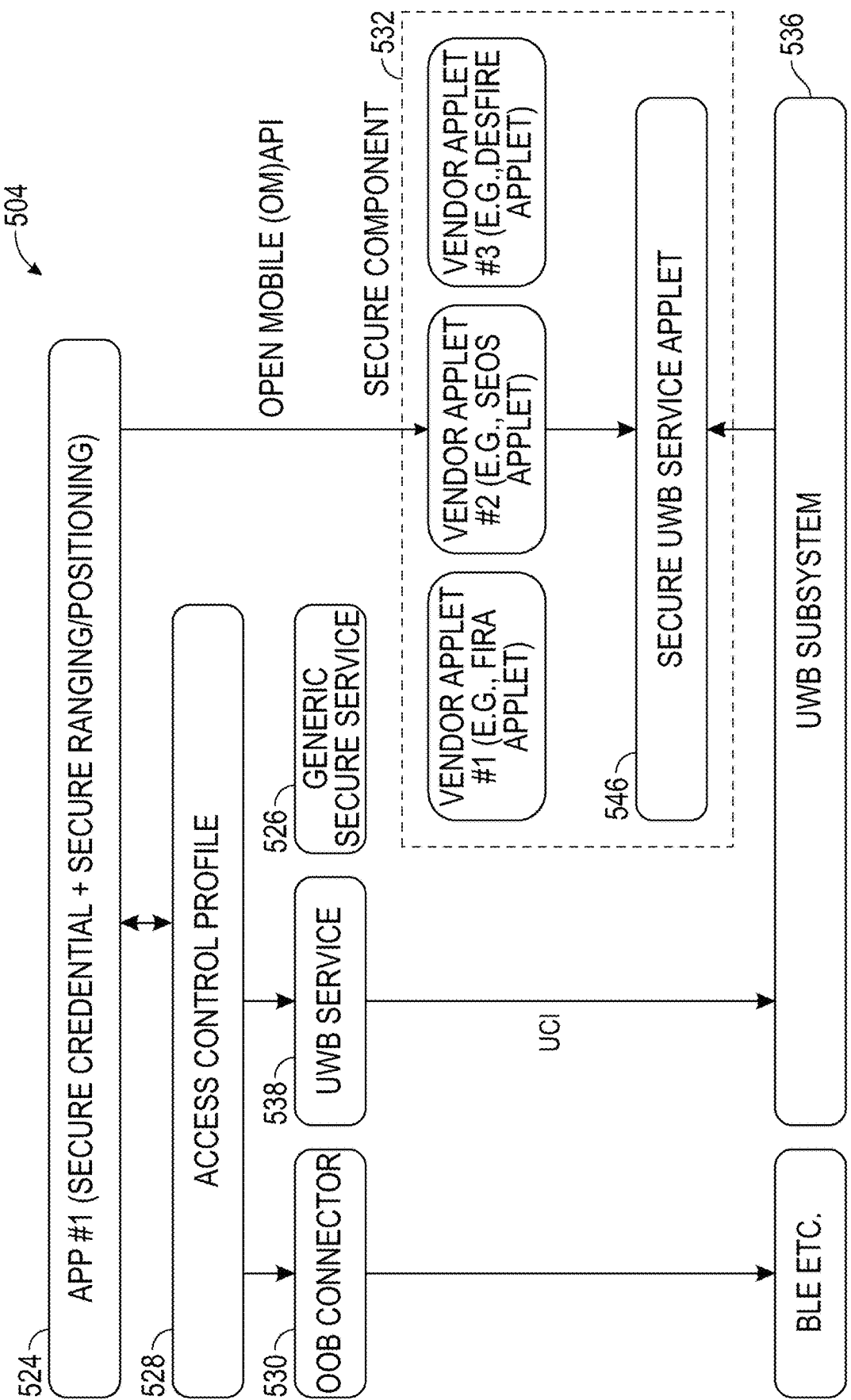
FIG. 5 is a block diagram of an example of interaction of a portion of the functional blocks of a Smart UWB capable device to implement a security profile.

FIG. 5 is a block diagram of an example of the interaction of a portion of the functional blocks of a Smart UWB capable device 504 to implement a security profile. In the example of FIG. 5, the security profile provides both secure credentialing and secure ranging/positioning. The Access Credential is included in the secure component 532 of the Smart UWB capable device 504. In the example if FIG. 5, the secure component 532 of the Smart UWB capable device 504 includes third party Vendor Applets. The Vendor Applets may provide one or both of secure ranging/positioning (e.g., a Fine Ranging (FiRa) Applet 540) and secure credentialing (e.g., an Seos® credentialing Applet 542, or a DESFire® credentialing Applet 544). The secure component 532 also includes a secure UWB Service Applet 546. The UWB enabled Application 524 requests or requires both secure credentialing and secure ranging/positioning. In response, a secure channel is opened directly between the UWB enabled Application 524 and a Vendor Applet (e.g., the Seos® Applet) to provide secure credentialing and secure ranging/positioning. Note that the Generic Secure Service is 526 is not used. The secure UWB Service Applet 546 may include an API (e.g., a secure UWB service (SUS) API) to provide internal access by the Vendor Applet to the secure UWB Service Applet 546. The API binds the secure element to the UWB subsystem 536. The UWB Subsystem 536 may include a SUS API external to the secure component 532. The OOB session data is transferred using the OOB connector 530. Secure UWB session data is transferred using the UWB Subsystem 536 to perform secure credentialing and ranging with a Reader device. The secure credentialing and ranging sessions may be managed by the UWB service. While the credentialing and ranging/positioning will be performed by the UWB Framework, the credentialing and ranging session data is transferred from the secure component to ensure security of the session.

Figure 6:
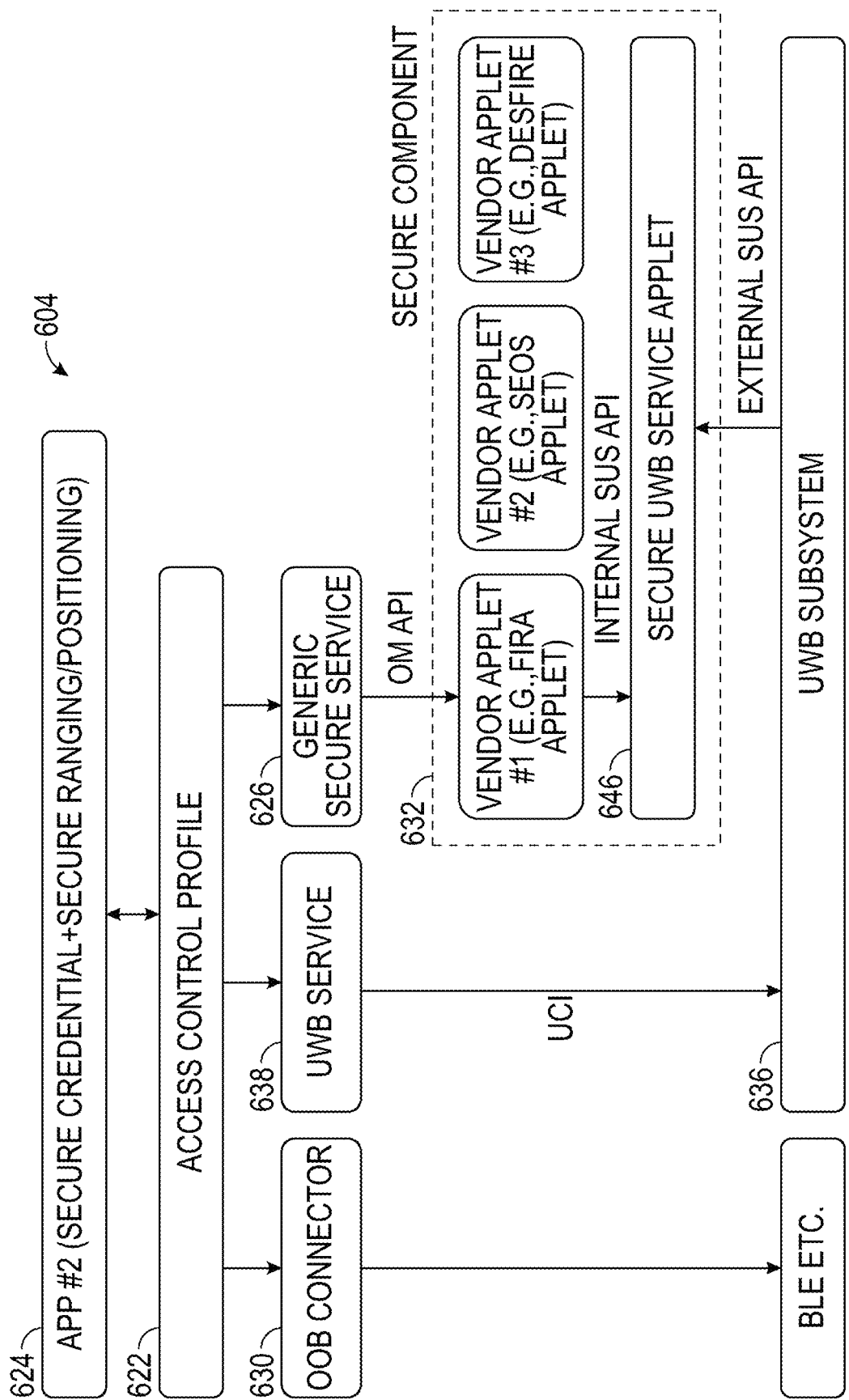
FIG. 6 is a block diagram of another example of the functional blocks of a smart UWB capable device implementing a security profile.

FIG. 6 is a block diagram of another example of the functional blocks of a Smart UWB capable device 604 implementing a different security profile. In the example of FIG. 6, the UWB enabled Application 624 requests or requires secure ranging/positioning but the credentialing is less secure than in the example of FIG. 5. The Access Credential is located outside the secure component 632 (e.g., in the Application processor or in a trusted execution environment). A secure channel for ranging/positioning is opened between the UWB enabled Application 624 and a Vendor Applet (e.g., the FiRa Applet) of the secure component 632 via the generic secure service 626. Internal and External SUS APIs may be used to bind the secure element to the secure UWB Service 646. A secure transfer of the access credential may take place via the OOB communication channel and a temporary session key can be provided to establish a secure connection for the secure ranging.

Figure 7:
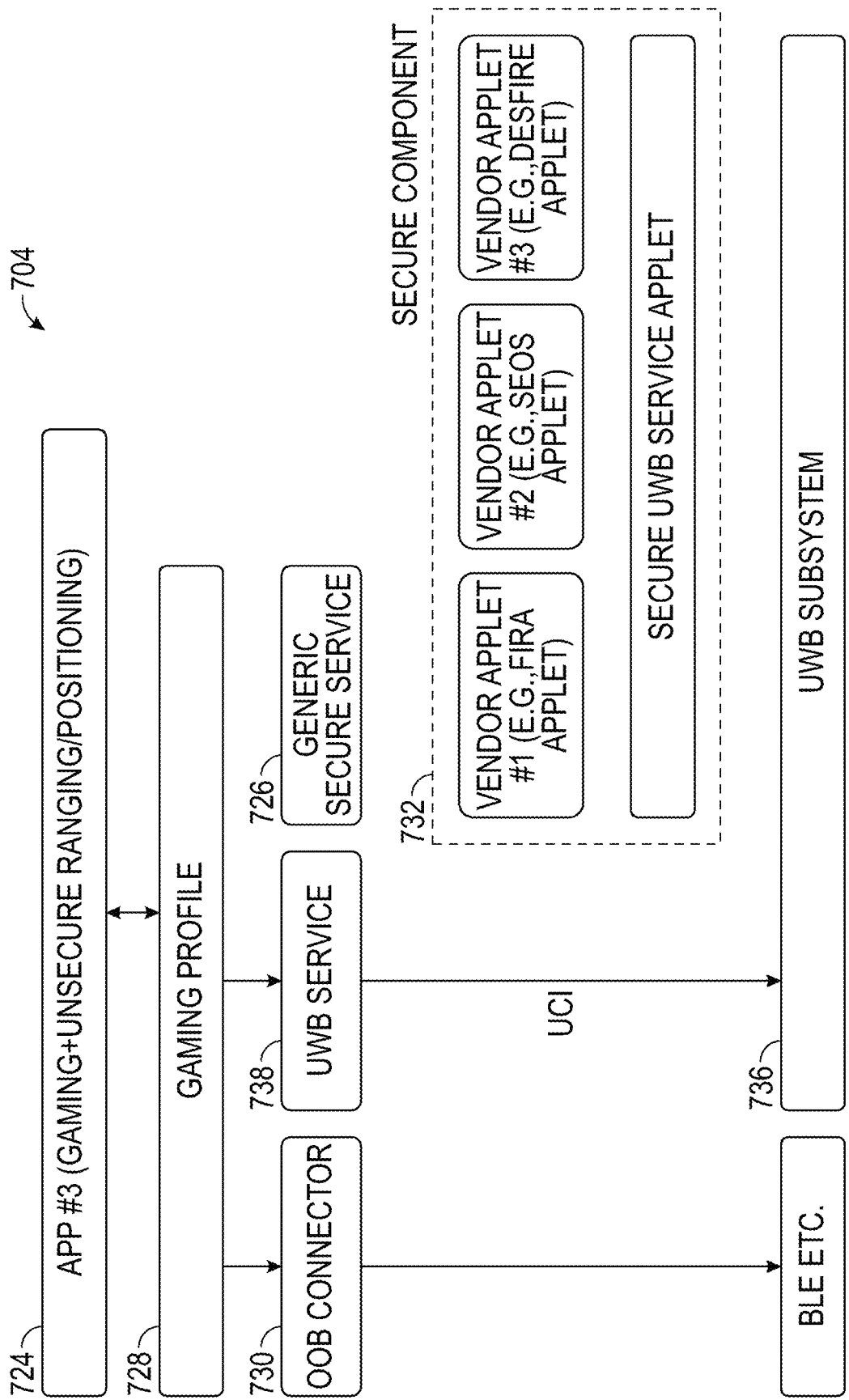
FIG. 7 is a block diagram of another example of the functional blocks of a smart UWB capable device implementing a security profile.

FIG. 7 is a block diagram of another example of the interaction of a portion of the functional blocks of a Smart UWB capable device 704 to implement another different security profile. In the example of FIG. 7, the UWB enabled Application 724 does not request or need secure credentialing or ranging/positioning. The UWB enabled Application 724 has a gaming service profile 728. Access to GOB connector 730 and the UWB Service 738 is unsecured and is given to the UWB enabled Application 724 without going through the generic secure service 726 or the secure component 732. Communication to the UWB Subsystem 736 is through the UCI.

Figure 8:
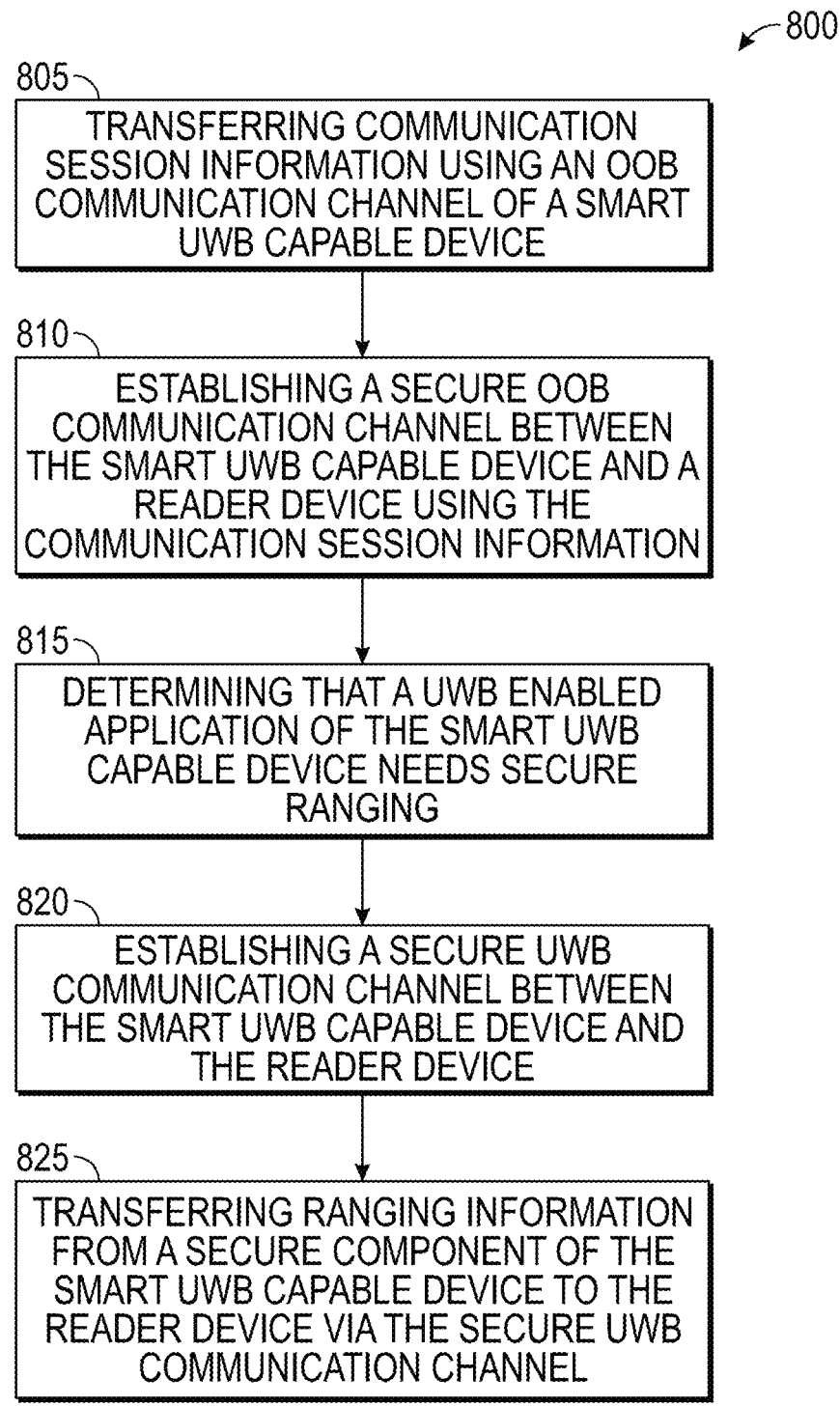
FIG. 8 is a flow diagram of a method 800 of operating a seamless PACS.

FIG. 8 is a flow diagram of a method 800 of operating a seamless PACS. At 805, communication session information is transferred between a smart UWB capable device and a reader device of the PACS using an OOB communication channel is established between the smart UWB device and the reader device. The OOB communication channel may be established when the smart UWB capable device is within range of the reader device. The reader device is a UWB capable device and authenticates access credential information. In certain examples, the reader device also grants or denies access through a portal (e.g., an automatic door) according to the access credential information. At 810, a secure OOB communication channel is established between the smart UWB capable device and a reader device using the communication session information. The secure channel can be established by the smart UWB capable device sending a session key to the reader device. In certain examples, a vendor applet of the smart UWB capable device is the source of the session key.

At 815, it is determined that a UWB enabled application of the smart UWB capable device needs secure ranging. The request or requirement for secure ranging may be communicated in service-profile information for the UWB enabled application sent by the smart UWB capable device. In certain examples, the service-profile information is sent as part of registering one or more UWB enabled applications with the reader device. At 820, a secure UWB communication channel is established between the smart UWB capable device and the reader device. The communication of information between the smart UWB capable device and the reader device may change from the OOB communication channel to the UWB communication channel when the secure UWB communication channel is established.

At 825, ranging information is transferred from a secure component of the smart UWB capable device to the reader device via the secure UWB communication channel. The smart UWB capable device may send access credential information over a secure OOB communication channel and send ranging information over the secure UWB communication channel. In some examples, both the access credential information and the ranging information is sent over the secure UWB communication channel according the information included in the service-profile. In some examples, the smart UWB capable device does not request or require a secure channel. The access credential information is sent using an unsecured OOB channel and the ranging information is transferred using an unsecured UWB channel.

Figure 9:
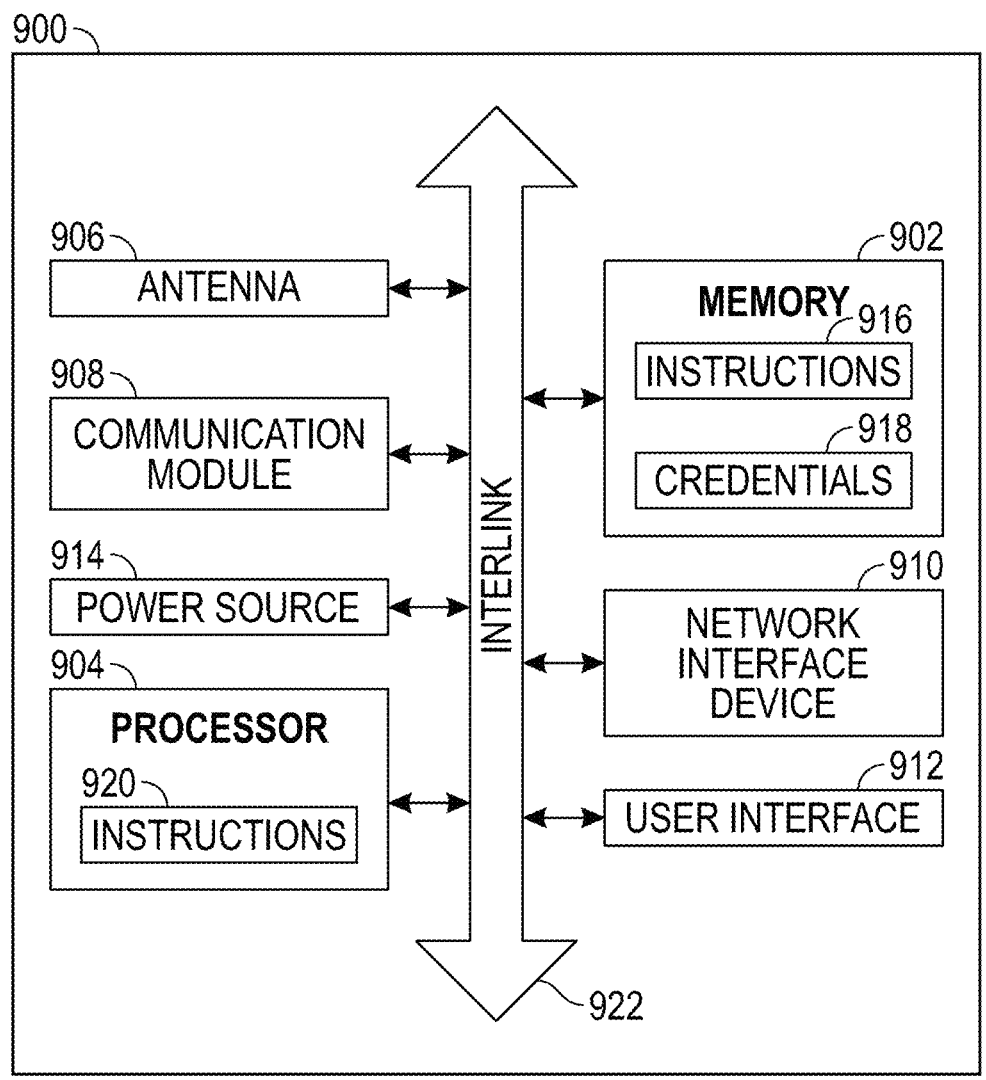
FIG. 9 is a block diagram schematic of portions of an example of a smart UWB capable device or a UWB capable device.

FIG. 9 is a block diagram schematic of various example components of a smart UWB capable device (e.g., a multi-profile device) or UWB capable device 900 (e.g., an embedded or single profile device) for supporting the device architectures described and illustrated herein. The device 900 of FIG. 9 could be, for example, a credential device that carries evidence of authority, status, rights, and/or entitlement to privileges for a holder of the credential device. At a basic level, a credential device can be a portable device having memory, storing one or more user credentials or credential data, and an interface (e.g., one or more antennas and Integrated Circuit (IC) chip(s)), which permit the credential device to exchange data with another device, such as another credential device or a reader device. One example of credential device is an RFID smartcard that has data stored thereon allowing a holder of the credential device to access a secure area or asset protected by a reader device.

With reference specifically to FIG. 9, additional examples of a smart UWB capable device or UWB capable device 900 for supporting the device architecture described and illustrated herein may generally include one or more of a memory 902, a processor 904, one or more antennas 906, a communication module 908, a network interface device 910, a user interface 912, and a power source 914 or power supply.

Memory 902 can be used in connection with the execution of application programming or instructions by processor 904, and for the temporary or long-term storage of program instructions or instruction sets 916 and/or credential or authorization data 918, such as credential data, credential authorization data, or access control data or instructions, as well as any data, data structures, and/or computer-executable instructions needed or desired to support the above-described device architecture. For example, memory 902 can contain executable instructions 916 that are used by the processor 904 to run other components of device 900, to make access determinations based on credential or authorization data 918, and/or to perform any of the functions or operations described herein, such as the method of FIG. 8 for example. Memory 902 can comprise a computer readable medium that can be any medium that can contain, store, communicate, or transport data, program code, or instructions for use by or in connection with device 900. The computer readable medium can be, for example but is not limited to, an electronic, magnetic, optical, electromagnetic, infrared, or semiconductor system, apparatus, or device. More specific examples of suitable computer readable medium include, but are not limited to, an electrical connection having one or more wires or a tangible storage medium such as a portable computer diskette, a hard disk, a random access memory (RAM), a read-only memory (ROM), an erasable programmable read-only memory (EPROM or Flash memory), Dynamic RAM (DRAM), any solid-state storage device, in general, a compact disc read-only memory (CD-ROM), or other optical or magnetic storage device. Computer-readable media includes, but is not to be confused with, computer-readable storage medium, which is intended to cover all physical, non-transitory, or similar embodiments of computer-readable media.

Processor 904 can correspond to one or more computer processing devices or resources. For instance, processor 904 can be provided as silicon, as a Field Programmable Gate Array (FPGA), an Application-Specific Integrated Circuit (ASIC), any other type of Integrated Circuit (IC) chip, a collection of IC chips, or the like. As a more specific example, processor 904 can be provided as a microprocessor, Central Processing Unit (CPU), or plurality of microprocessors or CPUs that are configured to execute instructions sets stored in an internal memory 920 and/or memory 902.

Antenna 906 can correspond to one or multiple antennas and can be configured to provide for wireless communications between device 900 and another device. Antenna(s) 906 can be arranged to operate using one or more wireless communication protocols and operating frequencies including, but not limited to, the IEEE 802.15.1, Bluetooth, Bluetooth Low Energy (BLE), near field communications (NFC), ZigBee, GSM, CDMA, Wi-Fi, RF, UWB, and the like. In an example, antenna 906 may include one or more antennas arranged to operate using UWB for in band activity/communication and Bluetooth (e.g., BLE) for out-of-band (OOB) activity/communication. However, any RFID or personal area network (PAN) technologies, such as the IEEE 802.15.1, near field communications (NFC), ZigBee, GSM, CDMA, Wi-Fi, etc., may alternatively or additionally be used for the OOB activity/communication described herein.

Device 900 may additionally include a communication module 908 and/or network interface device 910. Communication module 908 can be configured to communicate according to any suitable communications protocol with one or more different systems or devices either remote or local to device 900. Network interface device 910 includes hardware to facilitate communications with other devices over a communication network utilizing any one of a number of transfer protocols (e.g., frame relay, internet protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), mobile telephone networks (e.g., cellular networks), Plain Old Telephone (POTS) networks, wireless data networks (e.g., IEEE 802.11 family of standards known as Wi-Fi, IEEE 802.16 family of standards known as WiMax), IEEE 802.15.4 family of standards, and peer-to-peer (P2P) networks, among others. In some examples, network interface device 910 can include an Ethernet port or other physical jack, a Wi-Fi card, a Network Interface Card (NIC), a cellular interface (e.g., antenna, filters, and associated circuitry), or the like. In some examples, network interface device 910 can include a plurality of antennas to wirelessly communicate using at least one of single-input multiple-output (SIMO), multiple-input multiple-output (MIMO), or multiple-input single-output (MISO) techniques. In some example embodiments, one or more of the antenna 906, communication module 908, and/or network interface device 910 or subcomponents thereof, may be integrated as a single module or device, function or operate as if they were a single module or device, or may comprise of elements that are shared between them.

User interface 912 can include one or more input devices and/or display devices. Examples of suitable user input devices that can be included in user interface 912 include, without limitation, one or more buttons, a keyboard, a mouse, a touch-sensitive surface, a stylus, a camera, a microphone, etc. Examples of suitable user output devices that can be included in user interface 912 include, without limitation, one or more LEDs, an LCD panel, a display screen, a touchscreen, one or more lights, a speaker, etc. It should be appreciated that user interface 912 can also include a combined user input and user output device, such as a touch-sensitive display or the like.

Power source 914 can be any suitable internal power source, such as a battery, capacitive power source or similar type of charge-storage device, etc., and/or can include one or more power conversion circuits suitable to convert external power into suitable power (e.g., conversion of externally-supplied AC power into DC power) for components of the device 900.

Device 900 can also include one or more interlinks or buses 922 operable to transmit communications between the various hardware components of the device. A system bus 922 can be any of several types of commercially available bus structures or bus architectures.

Additional Disclosure and Examples

Example 1 includes subject matter (such as a method of operating a seamless physical access control system) comprising transferring communication session information using an out-of-band (OOB) communication channel of a smart ultra-wide band (UWB) capable device; establishing a secure OOB communication channel between the smart UWB capable device and a reader device using the communication session information; determining that a UWB enabled application of the smart UWB capable device needs secure ranging; establishing a secure UWB communication channel between the smart UWB capable device and the reader device; and transferring ranging information from a secure component of the smart UWB capable device to the reader device via the secure UWB communication channel.

In Example 2, the subject matter of Example 1 optionally includes transferring access credential information from the smart UWB capable device via the secure OOB communication channel.

In Example 3, the subject matter of one or both of Examples 1 and 2 optionally include determining that the UWB enabled application needs secure credentialing; and transferring access credential information from the secure component of the smart UWB capable device to the reader device via the secure UWB communication channel.

In Example 4, the subject matter of one or any combination of Examples 1-3 optionally includes determining that another UWB enabled application of the smart UWB capable device uses unsecured credentialing and unsecured ranging; transferring access credential information from the other UWB enabled application to the reader device using an unsecured OOB communication channel; and transferring ranging information from the other UWB enabled application to the reader device using an unsecured UWB communication channel.

In Example 5, the subject matter of one or any combination of Examples 1-4 optionally includes the UWB enabled application of the smart UWB capable device registering with a host process of the reader device by providing service-profile information for the UWB enabled application to the host process.

In Example 6, the subject matter of Example 5 optionally includes the host process transferring profile application programming interface (API) information to the UWB enabled application of the smart UWB capable device via OOB messaging in response to the registering.

In Example 7, the subject matter of one or any combination of Examples 1-6 optionally includes transferring a temporary session key from the secure component of the smart UWB enabled device to a host process of the reader device.

Example 8 includes subject matter (such as a smart ultra-wide band (UWB) enabled device) or can optionally be combined with one or any combination of Examples 1-7 to include such subject matter, comprising a UWB communication port; an out-of-band (OOB) communication port; a UWB enabled application; and an application processor. The application processor is configured to send service-profile information for the UWB enabled application to the second device using an OOB communication channel; send communication session information to a second device to establish a secure OOB communication channel; exchange information with the second device to establish a secure UWB communication channel according to the service-profile information; and transfer ranging information to the second device using the secure UWB communication channel.

In Example 9, the subject matter of Example 8 optionally includes memory to store access credential information; and wherein the application processor is configured to send the access credential information to the second device using the secure OOB communication channel.

In Example 10, the subject matter of Example 9 optionally includes a secure component. The secure component includes memory to store the ranging information; and an applet configured to transfer the ranging information using the secure UWB channel. The application processor optionally includes a secure service configured to transfer the ranging information to the UWB enabled application.

In Example 11, the subject matter of Example 8 optionally includes a secure component. The secure component includes memory to store access credential information and the ranging information; and an applet configured to transfer the access credential information from the secure component memory to the second device using the secure UWB communication channel.

In Example 12, the subject matter of Example 11 optionally includes an applet configured to transfer a temporary session key to the second device to establish the secure OOB communication channel.

In Example 13, the subject matter of one or any combination of Examples 8-12 optionally includes memory to store access credential information. The application processor is configured to transfer, according to the service-profile information, the access credential information using an unsecured OOB communication channel; and transfer, according to the service-profile information, the ranging information using an unsecured UWB communication channel.

In Example 14, the subject matter of one or any combination of Examples 8-13 optionally includes an application processor configured to receive profile application programming interface (API) information via the OOB communication port in response to sending the service-profile information; transfer ranging information over the secure UWB communication channel according to the profile API.

Example 15 includes subject matter (such as a reader device of a seamless physical access control system) or can optionally be combined with one or any combination of Examples 1-14 to include such subject matter, comprising an ultra-wide band (UWB) communication port; an out-of-band (OOB) communication port; a host processor operatively coupled to the UWB communication port and the OOB communication port and configured to receive service-profile information via the OOB communication port, the service-profile information for a UWB enabled application of a second device; establish, according to the service-profile information, a secure OOB communication channel using communication session information received from the second device; exchange information with the second device to establish a secure UWB communication channel according to the service-profile information; and receive ranging information from the second device using the secure UWB communication channel.

In Example 16, the subject matter of Example 15 optionally includes a host processor configured to receive, according to the service-profile information, access credential information from the second device via the secure OOB communication channel; and authenticate the received access credential information.

In Example 17, the subject matter of one or both of Examples 15 and 16 optionally includes a host processor configured to receive, according to the service-profile information, access credential information from the second device via the secure UWB communication channel; and authenticate the received access credential information.

In Example 18, the subject matter of one or any combination of Examples 15-17 optionally includes a host processor configured to receive, according to the service-profile information, access credential information from the second device using an unsecured OOB communication channel and receive the ranging information from the second device using an unsecured UWB communication channel.

In Example 19, the subject matter of one or any combination of Examples 15-18 optionally includes a host processor configured to receive registration information associated with the UWB enabled application via the OOB communication port; and transfer profile application programming interface (API) information to the UWB enabled application via GOB messaging in response to receiving the registration information.

In Example 20, the subject matter of one or any combination of Examples 15-19 optionally includes a host processor is configured to establish the secure OOB communication channel using a temporary session key received via the OOB communication port from the second device.

The non-limiting Examples can be combined in any permutation or combination. The above detailed description includes references to the accompanying drawings, which form a part of the detailed description. The drawings show, by way of illustration, specific embodiments in which the invention can be practiced. These embodiments are also referred to herein as "examples." All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

The above examples can be combined in any permutation.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. In the above Detailed Description, various features may be grouped together to streamline the disclosure. This should not be interpreted as intending that an unclaimed disclosed feature is essential to any claim. Rather, the subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope should be determined with reference to the appended claims, along with the full scope of equivalents to which such claims are entitled.

What is claimed is:

1. A method of operating a seamless physical access control system, the method comprising:
    establishing a secure out-of-band (OOB) communication channel between a smart ultra-wide band (UWB) capable device and a reader device;
    storing service profile information of multiple UWB enabled applications of the smart UWB capable device;
    registering the service profile information with a host process of the reader device using the secure OOB communication channel;
    establishing a secure UWB communication channel between the smart UWB capable device and the reader device and transferring ranging information to the reader device for a first UWB enabled application using the secure UWB communication channel when the registered service-profile information indicates the first UWB enabled application uses secure ranging; and
    transferring ranging information for a second UWB enabled application to the reader device using an unsecured communication channel when the registered service-profile information indicates the second UWB enabled application uses unsecured ranging.

2. The method of claim 1, including:
    transferring credential information from a secure component of the smart UWB enabled device using the secure UWB communication channel for the first UWB enabled application when the registered service-profile information indicates the first UWB enabled application uses secure credentialing; and
    transferring credential information using the unsecured communication channel for the second UWB enabled application when the registered service-profile information indicates the second UWB enabled application uses unsecured credentialing.

3. The method of claim 1, including:
transferring ranging information using the secure UWB communication channel for a third UWB enabled application when the registered service-profile information indicates the third UWB enabled application uses secure ranging; and
transferring credential information from outside a secure component of the smart UWB enabled device using the secure UWB communication channel for the third UWB enabled application when the registered service-profile information indicates the third UWB enabled application uses secure credentialing.

4. The method of claim 1, including
transferring credential information from a secure component of the smart UWB enabled device using the secure UWB communication channel for the first UWB enabled application when the registered service-profile information indicates the first UWB enabled application uses secure credentialing; and
transferring credential information from a secure UWB service using the secure UWB communication channel for a third UWB enabled application when the registered service-profile information indicates the first UWB enabled application uses secure credentialing.

5. The method of claim 1, including:
transferring credential information using an unsecured OOB communication channel for the second UWB enabled application when the registered service-profile information indicates the second UWB enabled application has a gaming service profile.

6. The method of claim 1, including the host process of the reader device transferring profile application programming interface (API) information to the first and second UWB enabled applications of the smart UWB capable device via GOB messaging in response to the registering of the service profile information.

7. The method of claim 1, including:
transferring credential information from a secure component of the smart UWB enabled device using a secure UWB communication channel for the first UWB enabled application when the registered service-profile information indicates the first UWB enabled application uses secure credentialing;
authenticating the first UWB enabled application using the credential information; and
terminating the OOB communication channel and transferring ranging information to the reader device using the secure UWB communication channel for the first UWB enabled application when the first UWB enabled application is authenticated.

8. The method of claim 1, including:
transferring credential information from the smart UWB enabled device using the secure GOB communication channel when the registered service-profile information indicates the first UWB enabled application uses secure credentialing;
authenticating the first UWB enabled application using the credential information; and
sending a temporary session key from the reader device to the smart UWB enabled device when the smart UWB enabled device is authenticated to transfer the secure ranging information using the secure UWB channel.

9. The method of claim 1, wherein the establishing the OOB communication channel includes establishing a Bluetooth Low Energy (BLE) communication channel between the UWB capable device and the reader device.

10. A smart ultra-wide band (UWB) enabled device, the device including:
a UWB communication port;
an out-of-band (OOB) communication port;
memory to store multiple UWB enabled applications and service profile information for the multiple UWB enabled applications; and
an application processor configured to:
establish a secure OOB communication channel with a separate device and register the service profile information with the separate device using the secure OOB communication channel;
establish a secure UWB communication channel with the separate device and transfer ranging information to the separate device using the secure UWB communication channel when a first UWB enabled application communicates with the separate device and the service profile information of the first UWB enabled application indicates the first UWB enabled application uses secure ranging; and
establish an unsecured communication channel with the separate device and transfer ranging information to the separate device using the unsecured communication channel when a second UWB enabled application communicates with the separate device and the service profile information of the second UWB enabled application indicates the first UWB enabled application uses unsecured ranging.

11. The device of claim 10, including:
a secure component; and
wherein the application processor is configured to:
transfer credential information for the first UWB enabled application from the secure component to the separate device using the secure UWB communication channel when the service-profile information indicates the first UWB enabled application uses secure credentialing; and
transfer credential information using the unsecured communication channel for the second UWB enabled application when the registered service-profile information indicates the second UWB enabled application uses unsecured credentialing.

12. The device of claim 11, wherein the application processor is configured to transfer credential information from a secure UWB service using the secure UWB communication channel for a third UWB enabled application when the registered service-profile information indicates the first UWB enabled application uses secure credentialing.

13. The device of claim 11, wherein the application processor is configured to:
transfer ranging information for a third UWB enabled application using the secure UWB communication channel when the registered service-profile information indicates the third UWB enabled application uses secure ranging; and
transfer credential information for the third UWB enabled application from outside the secure component using the secure UWB communication channel when the registered service-profile information indicates the third UWB enabled application uses secure credentialing.

14. The device of claim 11, wherein the application processor is configured to transfer credential information using an unsecured OOB communication channel for the second UWB enabled application when the registered service-profile information indicates the second UWB enabled application has a gaming service profile.

15. The device of claim 11, wherein the application processor is configured to read profile application programming interface (API) information of the separate device in response to registering the service profile information.

16. The device of claim 11, wherein the application processor is configured to:
- transfer credential information for the first UWB enabled application from the secure component to the separate device using the secure UWB communication channel when the first UWB enabled application communicates with the separate device and the registered service-profile information indicates the first UWB enabled application uses secure credentialing; and
- terminate the OOB channel and transfer the ranging information for the first UWB enabled application to the reader device using the secure UWB communication channel in response to the first UWB enabled application being authenticated.

17. The device of claim 11, including:
- transfer credential information for the first UWB enabled application from the secure component to the separate device using the secure OOB communication channel when the first UWB enabled application communicates with the separate device and the registered service-profile information indicates the first UWB enabled application uses secure credentialing; and
- decode a temporary session key received from the separate device in response to the smart UWB enabled device being authenticated to establish the secure UWB channel.

18. The device of claim 10, wherein the OOB communication port is a Bluetooth Low Energy (BLE) communication port.

19. The device of claim 10, wherein the application processor is configured to implement a service application layer configured to aggregate and expose service profiles of multiple UWB enabled applications to register the service profiles with the separate device.

20. A non-transitory machine-readable storage medium including instructions that, when performed using an application processor of a smart ultra-wide band (UWB) enabled device, cause the smart UWB enabled device to perform acts comprising:
- establishing a secure out-of-band (OOB) communication channel with a reader device;
- registering service profile information of multiple UWB enabled applications of the smart UWB capable device with the reader device using the secure OOB communication channel;
- establishing a secure UWB communication channel between the smart UWB capable device and the reader device;
- transferring ranging information to the reader device using the secure UWB communication channel for a first UWB enabled application when the registered service-profile information indicates the first UWB enabled application uses secure ranging; and transferring ranging information from a second UWB enabled application to the reader device using an unsecured communication channel when the registered service-profile information indicates the second UWB enabled application uses unsecured ranging.

* * * * *